United States Patent
Goto et al.

(10) Patent No.: US 11,958,994 B2
(45) Date of Patent: *Apr. 16, 2024

(54) SHEET, ORNAMENTAL MATERIAL, AND RESIN COMPOSITION

(71) Applicant: Dai Nippon Printing Co., Ltd., Tokyo (JP)

(72) Inventors: Osamu Goto, Yoshikawa (JP); Mayuko Komurasaki, Misato (JP); Takashi Endoh, Inzai (JP); Toshiyuki Sakai, Tsukuba (JP); Masanori Ueno, Fujimi (JP); Satoshi Furuta, Asaka (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 17/442,858

(22) PCT Filed: Mar. 30, 2020

(86) PCT No.: PCT/JP2020/014500
§ 371 (c)(1),
(2) Date: Oct. 21, 2021

(87) PCT Pub. No.: WO2020/203956
PCT Pub. Date: Oct. 8, 2020

(65) Prior Publication Data
US 2022/0177737 A1 Jun. 9, 2022

(30) Foreign Application Priority Data

Mar. 29, 2019 (JP) .................................. 2019-067864
Sep. 30, 2019 (JP) .................................. 2019-181049

(51) Int. Cl.
*C09J 7/29* (2018.01)
*B32B 7/12* (2006.01)
(Continued)

(52) U.S. Cl.
CPC ................. *C09J 7/29* (2018.01); *B32B 7/12* (2013.01); *B32B 15/08* (2013.01); *B32B 27/18* (2013.01);
(Continued)

(58) Field of Classification Search
None
See application file for complete search history.

(56) References Cited

U.S. PATENT DOCUMENTS

2006/0052491 A1* 3/2006 Braig ................. D06M 13/358
524/99
2006/0234061 A1* 10/2006 Buckel ..................... C08K 5/34
428/412

(Continued)

FOREIGN PATENT DOCUMENTS

EP 2762309 A1 8/2014
JP H09-174767 A 7/1997
(Continued)

OTHER PUBLICATIONS

Takahashi—JP 2008-105372 A—Euro D2—MT—face sheet w-print+protectiveprimer+surface protective layers—2008 (Year: 2008).*
(Continued)

*Primary Examiner* — John Vincent Lawler
(74) *Attorney, Agent, or Firm* — Locke Lord LLP

(57) ABSTRACT

Provided is a decorative sheet having extremely good bleed-out suppression and long-term weather resistance maintenance. The decorative sheet has at least a substrate layer and a surface protective layer, and contains a hydroxyphenyltriazine compound of the general formula (I) in at least any layer of the decorative sheet (Continued)

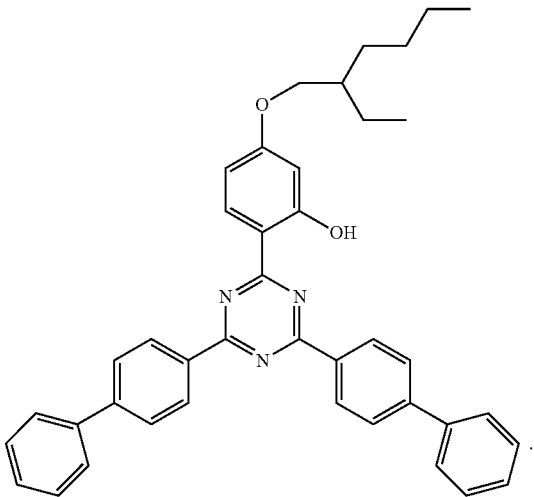

(I)

10 Claims, 1 Drawing Sheet

(51) Int. Cl.
*B32B 15/08* (2006.01)
*B32B 27/18* (2006.01)
*C09J 7/30* (2018.01)
*C09J 11/06* (2006.01)

(52) U.S. Cl.
CPC ............. *C09J 7/30* (2018.01); *C09J 11/06* (2013.01); *C09J 2301/41* (2020.08); *C09J 2400/166* (2013.01); *C09J 2475/00* (2013.01)

(56) References Cited

U.S. PATENT DOCUMENTS

| | | | |
|---|---|---|---|
| 2007/0054991 | A1 | 3/2007 | Rudiger et al. |
| 2011/0143128 | A1* | 6/2011 | Saitou ............... B29C 45/14811 428/335 |
| 2014/0065384 | A1* | 3/2014 | Saitou ............... B29C 45/1418 428/201 |
| 2014/0349096 | A1* | 11/2014 | Miyazaki ............ B32B 15/04 428/216 |
| 2016/0107428 | A1 | 4/2016 | Nakaya et al. |
| 2016/0325531 | A1* | 11/2016 | Kühn ................. B32B 27/308 |
| 2017/0114215 | A1 | 4/2017 | Ooaira et al. |
| 2017/0197391 | A1 | 7/2017 | Parusel et al. |
| 2017/0266939 | A1 | 9/2017 | Nakaya et al. |
| 2021/0163710 | A1 | 6/2021 | Ehlis et al. |

FOREIGN PATENT DOCUMENTS

| | | | |
|---|---|---|---|
| JP | H09-314748 A | | 12/1997 |
| JP | H09-314749 A | | 12/1997 |
| JP | 2006-307142 A | | 11/2006 |
| JP | 2007-70630 A | | 3/2007 |
| JP | 2008/105372 | * | 5/2008 |
| JP | 2008-105372 A | | 5/2008 |
| JP | 2008-535700 A | | 9/2008 |
| JP | 2008/238444 | * | 10/2008 |
| JP | 2009-226869 A | | 10/2009 |
| JP | 2010-30277 A | | 2/2010 |
| JP | 2011/016277 | * | 1/2011 |
| JP | 2011/042041 | * | 3/2011 |
| JP | 2011-225813 A | | 11/2011 |
| JP | 2012/106506 | * | 6/2012 |
| JP | 2013-56497 A | | 3/2013 |
| JP | 5196042 B2 | | 5/2013 |
| JP | 5540589 B2 | | 7/2014 |
| JP | 2017-522201 A | | 8/2017 |
| JP | 2019-155777 A | | 9/2019 |
| JP | 2021-520428 A | | 8/2021 |
| WO | WO2000/51813 A1 * | | 9/2000 ............ B29C 69/00 |
| WO | 2014/192708 A1 | | 12/2014 |
| WO | 2015/156323 A1 | | 10/2015 |
| WO | 2016/084740 A1 | | 6/2016 |
| WO | WO-2018070438 A1 * | | 4/2018 |

OTHER PUBLICATIONS

Takahashi—JP 2008-238444 A—MT—primer layer w- protect. layer e-beam curable w- triazine UV absorber—2008 (Year: 2008).*
Sagawa—JP 2011-016277 A—MT—decorative sheet w- surf. protect. w- triazine UV absorber—2011 (Year: 2011).*
Sagawa—JP 2011-042041 A—MT—decorative sheet w- protect. layer w- (meth)acrylate+hydroxyphenyltrizaine UV absorber—2011 (Year: 2011).*
Takahashi—JP 2012-106506 A—MT—decorative sheet multilayer w- surf.protect. w- triazine compound—2012 (Year: 2012).*
Haraguchi—WO 2018-070438 A1—MT—hard coat layer w- curable comp.+trizine UV absorber—2018 (Year: 2018).*
ECHA—CGX UVA 006—Substance Information—accessed Apr. 7, 2023 (Year: 2023).*
Renner—WO 2000-051813 A1—MT—sheet w- water perm. values—2000 (Year: 2000).*
Supplementary European Search Report dated Nov. 21, 2022, issued for European Patent Application No. 20783295.7.
Notice of Reason for Refusal mailed Dec. 5, 2023, issued in JP Patent Application No. 2021-512105 and English translation thereof.
Lei Longhe, "Wood-Based Panel Surface Decoration, Textbook on Technical Theory for Wood Processing Workers," China Forestry Publishing House, Mar. 1991, p. 171 and English translation thereof.
Official communication published Jan. 4, 2024, issued in CN application No. 202080034068.5 and English translation thereof.

* cited by examiner

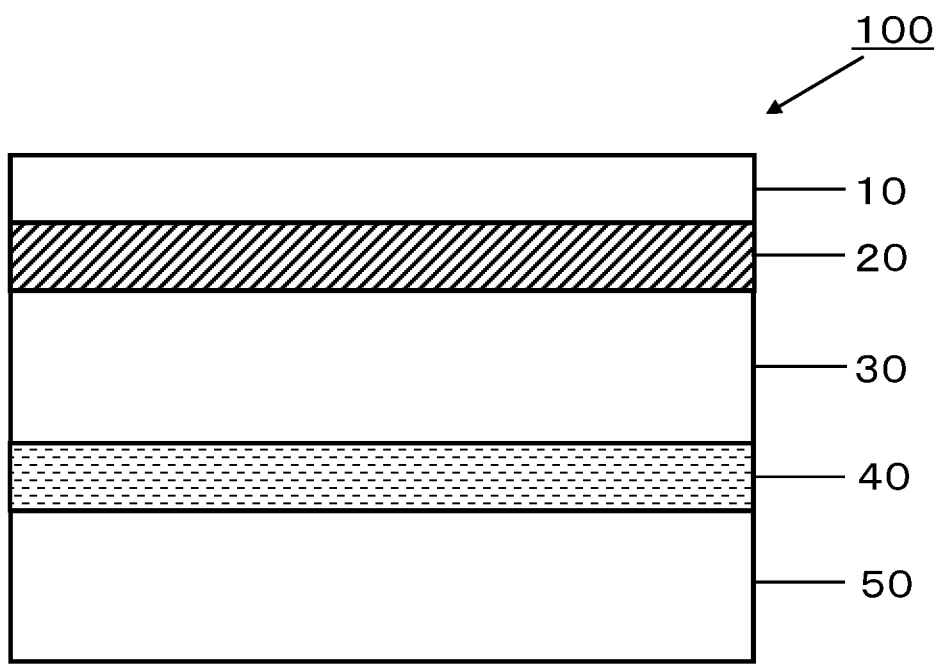

SHEET, ORNAMENTAL MATERIAL, AND RESIN COMPOSITION

TECHNICAL FIELD

The present invention relates to a decorative sheet, a decorative material and a resin composition.

BACKGROUND ART

Heretofore, decorative sheets are used for the purpose of decorating or protecting the surfaces of interior members and exterior members of buildings, interior members and exterior members of vehicles such as automobiles, as well as furniture, fixture members and home electric appliances. A decorative sheet is, for example, so configured as to have a surface protective layer on a substrate layer.

In outdoor use of such decorative sheets or even in indoor use thereof in a place exposed to sunlight such as at the window, they undergo discoloration or resin deterioration owing to influence of UV rays. Consequently, for the purpose of improving weather resistance, a decorative sheet prepared by adding a UV absorbent to a decorative sheet has been proposed.

As the UV absorbent, a benzophenone-based UV absorbent and a benzotriazole-based UV absorbent have been used, but these are not always satisfactory in performance aspect. Specifically, in order to attain sufficient weather resistance by use of a benzophenone-based UV absorbent and a benzotriazole-based UV absorbent, the amount of the UV absorbent to be added increases, and there occurs a problem that the UV absorbent may readily bleed out. In addition, a benzophenone-based UV absorbent and a benzotriazole-based UV absorbent greatly deteriorate with time, and therefore they can hardly maintain long-term weather resistance.

Recently, a decorative sheet using a triazine-based UV absorbent such as a hydroxyphenyltriazine compound has been proposed for solving the problem of the benzophenone-based UV absorbent and the benzotriazole-based UV absorbent (PTLs 1, 2).

CITATION LIST

Patent Literature

PTL 1: JP 5196042B
PTL 2: JP 5540589B

SUMMARY OF INVENTION

Technical Problem

The decorative sheets of PTLs 1 and 2 can prevent bleed-out and have good long-term weather resistance as compared with decorative sheets using a benzophenone-based UV absorbent and a benzotriazole-based UV absorbent.

Though the decorative sheets of PTLs 1 and 2 can prevent bleed-out and can maintain good long-term weather resistance as compared with conventional decorative sheets, they could not still satisfy these properties in use in severe environments and are desired to be improved more.

An object of the present invention is to provide a decorative sheet, a decorative material and a resin composition capable of preventing bleed-out and maintaining long-term weather resistance to a very good extent.

Solution to Problem

For solving the above-mentioned problem, the present invention provides the following [1] to [3].

[1] A decorative sheet having at least a substrate layer and a surface protective layer, and containing a hydroxyphenyltriazine compound represented by the following general formula (I) in at least any layer of the decorative sheet:

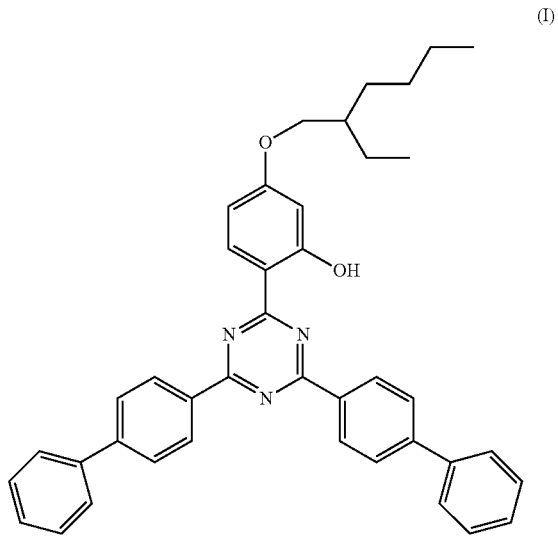

[2] A decorative material having an adherend and a decorative sheet according to the above [1].

[3] A resin composition for surface protective layer, containing a curable resin composition, and a hydroxyphenyltriazine compound represented by the following general formula (I):

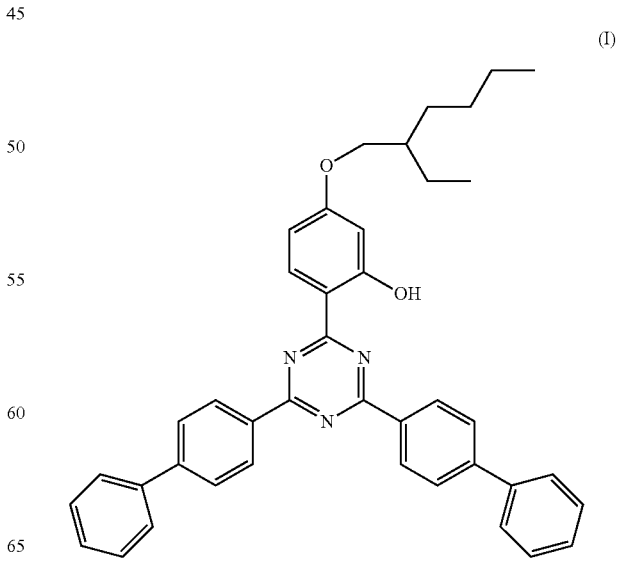

Advantageous Effects of Invention

According to the present invention, there can be provided a decorative sheet, a decorative material and a resin composition capable of preventing bleed-out and maintaining long-term weather resistance to a very good extent.

BRIEF DESCRIPTION OF DRAWING

FIG. 1 is a cross-sectional view showing one embodiment of a decorative sheet of the present invention.

DESCRIPTION OF EMBODIMENTS

[Decorative Sheet]

The decorative sheet of the present invention is a decorative sheet having at least a substrate layer and a surface protective layer, and containing a hydroxyphenyltriazine compound represented by the following general formula (I) in at least any layer of the decorative sheet:

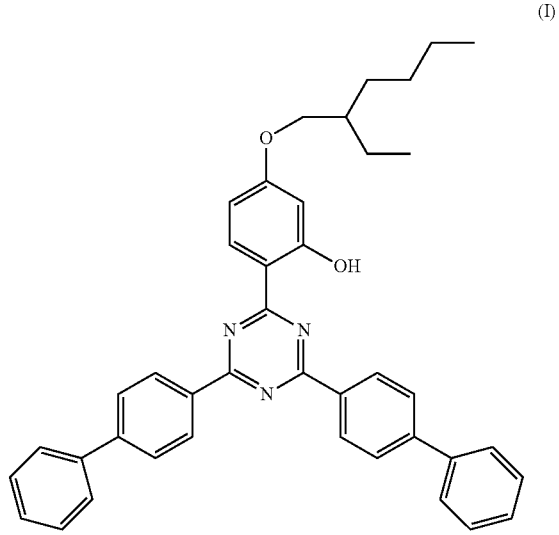

(I)

FIG. 1 is a cross-sectional view showing one typical embodiment of a decorative sheet 100 of the present invention.

The decorative sheet 100 of FIG. 1 has a surface protective layer 10 on a substrate layer 50. The decorative sheet 100 of FIG. 1 has a decorative layer 40, a transparent resin layer 30 and a primer layer 20, between the substrate layer 50 and the surface protective layer 10.

So far as having a basic configuration provided with a surface protective layer on a substrate layer, the decorative sheet of the present invention can select any form of various laminate configurations depending on the intended use and the required performance. For example, in the embodiment shown in FIG. 1, the decorative sheet 100 has a laminate configuration of the following (1), and can include the following (2) to (7) as other specific laminate configurations. In the following (1) to (7), "/" means an interlayer between the layers. Embodiments of each layer are described below.

(1) Substrate layer 50/decorative layer 40/transparent resin layer 30/primer layer 20/surface protective layer 10

(2) Substrate layer 50/surface protective layer 10

(3) Substrate layer 50/primer layer 20/surface protective layer 10

(4) Substrate layer 50/transparent resin layer 30/surface protective layer 10

(5) Substrate layer 50/decorative layer 40/surface protective layer 10

(6) Substrate layer 50/transparent resin layer 30/decorative layer 40/surface protective layer 10

(7) Substrate layer 50/transparent resin layer 30/decorative layer 40/primer layer 20/surface protective layer 10

In the above (1) to (7), an adhesive layer (adhesive layer A to be mentioned below) may be arranged between the substrate layer and the surface protective layer. In addition, the surfaces of the substrate layer, the transparent resin layer and others may be embossed to have patterns of pits and projections, such as woodgrain vessel channels, grains, satin patterns, hairlines or leather drawing patterns, by embossing treatment to be mentioned below.

<UV Absorbent>

The decorative sheet of the present invention contains a hydroxyphenyltriazine compound represented by the above-mentioned general formula (I) in at least any layer of the decorative sheet.

In the case where at least any layer of the decorative sheet does not contain a hydroxyphenyltriazine compound of the general formula (I), bleed-out suppression and long-term weather resistance maintenance cannot be bettered to a very good extent.

The reason why the hydroxyphenyltriazine compound of the general formula (I) can better bleed-out suppression and long-term weather resistance maintenance to a very good extent as compared with the hydroxyphenyltriazine compounds in PTL 1 and PTL 2 is considered to be because the hydroxyphenyltriazine compounds in PTL 1 and PTL 2 contain an ester bond in the molecule but the hydroxyphenyltriazine compound of the general formula (I) does not contain an ester bond in the molecule. More specifically, it is considered that, in the hydroxyphenyltriazine compounds in PTL 1 and PTL 2, the ester bond serves as a starting point to change the molecular structure of the compounds, and therefore bleed-out suppression and long-term weather resistance maintenance may be insufficient. In addition, the molecular structure change starting from the ester bond may be caused by acid condition. Consequently, the capability of bleed-out suppression and long-term weather resistance maintenance of the hydroxyphenyltriazine compounds in PTL 1 and PTL 2 may be readily insufficient in outdoor use exposed to acid rain.

The hydroxyphenyltriazine compound of the general formula (I) may be contained in at least any layer of the decorative sheet, but is preferably contained in the surface protective layer thereof. Containing the hydroxyphenyltriazine compound of the general formula (I) in the surface protective layer, the long-term weather resistance of the entire decorative sheet can be readily bettered.

In the case where the decorative sheet has one or more layers selected from a transparent resin layer and a primer layer, between the substrate layer and the surface protective layer, preferably, any of the transparent resin layer, the primer layer and the surface protective layer contains the hydroxyphenyltriazine compound of the general formula (I), more preferably, the surface protective layer contains the hydroxyphenyltriazine compound of the general formula (I), even more preferably, at least any of the transparent resin layer and the primer layer, and the surface protective layer contain the hydroxyphenyltriazine compound of the general formula (I). Having such a configuration, the long-term weather resistance of the entire decorative sheet can be readily bettered. In the more preferred embodiment, the weather resistance of the entire decorative sheet can still be bettered even when the amount of the hydroxyphenyltriazine compound of the general formula (I) to be added to the surface protective layer is reduced, and therefore in the case, bleed-out suppression can be bettered more.

The content of the hydroxyphenyltriazine compound of the general formula (I) could not be indiscriminately defined as varying depending on the thickness of the layer to which the compound is added, and on the number of the layers to which the compound is added, but for example, a content of the following (1) to (5) can be exemplified.

(1) In the case where a surface protective layer contains the hydroxyphenyltriazine compound of the general formula (I) and a binder resin, the content of the compound is preferably 0.01 to 30 parts by mass, more preferably 0.01 to 15 parts by mass, even more preferably 0.5 to 10 parts by mass, relative to 100 parts by mass of the binder resin in the surface protective layer.

(2) In the case where a primer layer contains the hydroxyphenyltriazine compound of the general formula (I) and a binder resin, the content of the compound is preferably 0.01 to 30 parts by mass, more preferably 0.01 to 15 parts by mass, even more preferably 0.5 to 10 parts by mass, relative to 100 parts by mass of the binder resin in the primer layer.

(3) In the case where a transparent resin layer contains the hydroxyphenyltriazine compound of the general formula (I) and a binder resin, the content of the compound is preferably 0.01 to 10 parts by mass, more preferably 0.01 to 5 parts by mass, even more preferably 0.01 to 3 parts by mass, relative to 100 parts by mass of the binder resin in the transparent resin layer.

(4) In the case where at least any of a transparent resin layer and a primer layer, and a surface protective layer contain the hydroxyphenyltriazine compound of the general formula (I) and a binder resin, the content of the compound in the surface protective layer is preferably 0.01 to 20 parts by mass, more preferably 0.01 to 10 parts by mass, even more preferably 0.01 to 5 parts by mass, relative to 100 parts by mass of the binder resin therein. In this case, the content of the compound in at least any of the transparent resin layer and the primer layer is preferably 0.01 to 20 parts by mass, more preferably 0.01 to 10 parts by mass, even more preferably 0.01 to 5 parts by mass, relative to 100 parts by mass of the binder resin therein.

(5) In the case where a substrate layer contains the hydroxyphenyltriazine compound of the general formula (I) and a binder resin, the content of the compound is preferably 0.01 to 10 parts by mass, more preferably 0.01 to 5 parts by mass, even more preferably 0.01 to 3 parts by mass, relative to 100 parts by mass of the binder resin in the substrate layer.

When the content of the hydroxyphenyltriazine compound is controlled to be not less than the lower limit of the above range, sufficient weather resistance can be exhibited, and when it is controlled to be not more than the upper limit of the range, bleed-out through membrane can be suppressed and weather resistance can be exhibited for a long period of time.

The decorative sheet of the present invention may contain any other UV absorbent than the hydroxyphenyltriazine compound of the general formula (I), within a range not detracting from the advantageous effects of the present invention.

The ratio of the hydroxyphenyltriazine compound of the general formula (I) to all the UV absorbents contained in the decorative sheet of the present invention is preferably 80% by mass or more, more preferably 90% by mass or more, even more preferably 95% by mass or more, further more preferably 99% by mass or more, and most preferably 100% by mass.

<Substrate Layer>

The substrate layer includes films, sheets and plates composed by various types of paper, plastics, metals, woven fabrics, nonwoven fabrics, woods and pottery industry materials.

In general, a planar substrate layer having a predetermined thickness is differentially referred to as films, sheets and plates in the order of thinner ones, but in the present invention, there is no specific necessity for differentiating the substrate layer depending on the thickness thereof, and therefore in this description, these designations are treated as having no substantial difference even if they are appropriately replaced with each other. In addition, the difference in these designations (difference in thickness) should not bring about any difference in interpreting the claims of the present invention. In the present description, a plastic film includes plastic films, sheets and plates.

The substrate layer is preferably a plastic film that betters the handleability of the entire decorative sheet. In general, plastics do not have sufficient weather resistance, but the decorative sheet contains the hydroxyphenyltriazine compound of the general formula (I), and therefore the plastic film as the substrate layer can secure good weather resistance.

Specific examples of the resin to constitute the plastic include a polyolefin resin such as a polyethylene, a polypropylene, an olefin-based thermoplastic elastomer, and an ethylene-based ionomer; a vinyl resin such as a vinyl chloride resin, a vinylidene chloride resin, a polyvinyl alcohol, a polyvinyl alcohol, and an ethylene-vinyl alcohol copolymer; a polyester such as a polyethylene terephthalate, a polybutylene terephthalate, a polyethylene naphthalate, a terephthalic acid-isophthalic acid-ethylene glycol copolymer, a terephthalic acid-ethylene glycol-1,4-cyclohexanedimethanol copolymer, and a polyester-based thermoplastic elastomer; an acrylic resin such as a polymethyl methacrylate, a polymethyl acrylate, and a polyethyl methacrylate; and a polystyrene, an acrylonitrile-butadiene-styrene copolymer (ABS resin), a cellulose triacetate, and a polycarbonate.

Among these, from the viewpoint of weather resistance, waterproofness, printability, molding workability and cost, one or more selected from a polyolefin resin, a vinyl chloride resin, a polyester and an acrylic resin are preferred. Also among these, a polyolefin resin is preferred from the viewpoint that the weather resistance thereof can be readily bettered by the hydroxyphenyltriazine compound of the general formula (I). In addition, a polypropylene resin and a polyvinyl chloride resin are preferred from the viewpoint that construction suitability and also long-term adhesiveness can be readily bettered since the moisture permeability of the decorative sheet can be readily controlled to fall within a predetermined range.

The polypropylene resin may be a homopolymer of propylene, i.e., polypropylene, or may be a copolymer of propylene with an additional comonomer (e.g., α-olefin such as ethylene, 1-butene, 1-hexene, and 1-octene; and vinyl acetate and vinyl alcohol) copolymerizable with propylene. These polypropylene may be used singly or may be used in combination of two or more thereof.

In the case of using a homopolymer of propylene (polypropylene), the moisture permeability can be controlled by controlling the degree of crystallization thereof. In general, the moisture permeability of a polypropylene resin tends to be decreased as the degree of crystallinity is elevated. In the case where the thickness of the substrate is approximately 40 µm or more and 200 µm or less, the degree of crystallinity is preferably 30% or more, more preferably 40% or more, and the upper limit is preferably 80% or less, more preferably 70% or less.

Also in the case of using a homopolymer of propylene (polypropylene), the moisture permeability of the substrate can be controlled by controlling the ratio by mass of isotactic polypropylene and atactic polypropylene. In general, the moisture permeability of the substrate can be lowered by adding isotactic polypropylene thereto, as compared with a case where the proportion of atactic polypropylene in polypropylene is 100% by mass. In this case, the ratio by mass of atactic polypropylene to isotactic polypropylene is preferably 0/100 to 20/80 in consideration of easiness in controlling the moisture permeability.

A homopolymer of a vinyl chloride monomer, i.e., polyvinyl chloride, or a copolymer of a vinyl chloride monomer with a monomer copolymerizable with the vinyl chloride monomer may be used as the vinyl chloride resin.

Examples of the monomer copolymerizable with the vinyl chloride monomer include: vinyl esters such as vinyl acetate and vinyl propionate; acrylic acid esters such as methyl acrylate and butyl acrylate; methacrylic acid esters such as methyl methacrylate and ethyl methacrylate; maleic acid esters such as butyl maleate and diethyl maleate; fumaric acid esters such as dibutyl fumarate and diethyl fumarate; vinyl ethers such as vinyl methyl ether, vinyl butyl ether and vinyl octyl ether; vinyl cyanides such as acrylonitrile and methacrylonitrile; olefins such as ethylene, propylene, butylene, and styrene; dienes such as isoprene and butadiene; vinylidene halides and vinyl halides, other than vinyl chloride, such as vinylidene chloride and vinyl bromide; and allyl phthalates such as diallyl phthalate. These monomers may be used singly or in combination of two or more thereof.

The average degree of polymerization of the vinyl chloride resin is preferably 500 to 4000, more preferably 700 to 3900, further preferably 1000 to 3800, from the viewpoint that moisture permeability easily falls within a predetermined range and from the viewpoint of improving construction suitability as well as long-term adhesiveness. When the average degree of polymerization falls within the range described above, excellent mechanical strength and moldability are also obtained. In the present description, the average degree of polymerization is an average degree of polymerization measured in accordance with JIS K6721.

In the present embodiment, in the case of using vinyl chloride resin, a plasticizer is preferably added from the viewpoint that moisture permeability easily falls within a predetermined range, from the viewpoint of improving construction suitability as well as long-term adhesiveness, and from the viewpoint of improving workability.

The plasticizer is not particularly limited as long as the plasticizer has compatibility with the vinyl chloride resin. Examples thereof include: phthalic acid plasticizers such as dibutyl phthalate (DBP), dioctyl phthalate (DOP), diisononyl phthalate (DINP), diisodecyl phthalate (DIDP), and diundecyl phthalate (DUP); adipic acid plasticizers such as dibutyl adipate; phosphoric acid plasticizers such as tributyl phosphate, tricresyl phosphate, and triphenyl phosphate; trimellitic acid plasticizers such as tributyl trimellitate and trioctyl trimellitate; various known polyester plasticizers such as adipic acid polyester; and citric acid esters such as acetyl tributyl citrate and acetyl trioctyl citrate. Among them, a phthalic acid plasticizer, an adipic acid plasticizer, and a polyester plasticizer are preferred, and a phthalic acid plasticizer and a polyester plasticizer are more preferred, from the viewpoint that a moisture permeability easily falls within the range described above, from the viewpoint of improving construction suitability as well as long-term adhesiveness, and from the viewpoint of improving workability. These plasticizers may be used singly or in combination of two or more thereof.

The content of the plasticizer can be appropriately adjusted, for use, according to the desired moisture permeability. Although cannot be generalized, usually, the moisture permeability of the vinyl chloride resin tends to be increased as the amount of the plasticizer added is increased. In consideration of this, the content of the plasticizer is preferably 15 parts by mass or more, more preferably 20 parts by mass or more, further preferably 25 parts by mass or more, the upper limit is preferably 50 parts by mass or less, more preferably 45 parts by mass or less, further preferably 35 parts by mass or less, with respect to 100 parts by mass of the vinyl chloride resin.

When the content of the plasticizer falls within the range described above, a moisture permeability is easily adjusted to the desired range and construction suitability as well as long-term adhesiveness can be improved. When the content of the plasticizer is 20 parts by mass or more, the vinyl chloride resin is softened so that workability can be improved. On the other hand, when the content is 50 parts by mass or less, the bleed-out of the plasticizer is suppressed. Thus, a moisture permeability is easily adjusted to the desired range stably, and construction suitability as well as long-term adhesiveness can be improved.

In the case of using, for example, a phthalic acid ester plasticizer, its content is preferably 25 parts by mass or more, more preferably 30 parts by mass or more, further preferably 35 parts by mass or more, the upper limit is preferably 50 parts by mass or less, more preferably 45 parts by mass or less, further preferably 40 parts by mass or less, with respect to 100 parts by mass of the vinyl chloride resin, particularly, from the viewpoint that a moisture permeability easily falls within the desired range and from the viewpoint of improving construction suitability as well as long-term adhesiveness. In the case of using a polyester plasticizer, its content is preferably 15 parts by mass or more, more preferably 18 parts by mass or more, further preferably 20 parts by mass or more, the upper limit is preferably 35 parts by mass or less, more preferably 30 parts by mass or less, further preferably 25 parts by mass or less, with respect to 100 parts by mass of the vinyl chloride resin.

For controlling the moisture permeability to fall within a predetermined range, preferably, the substrate is formed of a resin alone selected from a polypropylene resin and a polyvinyl chloride resin, but may contain any other resin. The other resin is preferably a resin including a polyolefin such as polyethylene (low-density, medium-density, high-density), polymethylpentene, polybutene, an ethylene-vinyl acetate copolymer, and an ethylene-acrylic acid copolymers, and polyethylene (low-density, medium-density, high-density) is more preferred.

The substrate layer may be colorless transparent, but may be colored from the viewpoint of design.

In the case of coloring the substrate layer, a colorant such as dye or pigment may be added to the substrate layer. Among such colorants, a hardly fading pigment is preferred.

Examples of the pigment include: white pigments such as zinc oxide, lead white, lithopone, titanium dioxide (titanium white), precipitated barium sulfate, and baryte; black pigments such as carbon black, azomethine azo black pigments and perylene black pigments; red pigments such as red lead, iron oxide red, quinacridone red, and polyazo red; yellow pigments such as lead yellow, zinc yellow (zinc yellow type 1 and zinc yellow type 2), isoindolinone yellow, and nickel-azo complexes; and blue pigments such as ultramarine blue, and Prussian blue (potassium ferrocyanide).

The thickness of the substrate layer is not specifically limited. In the case where the substrate layer is a plastic film, the thickness thereof is preferably 20 to 3200 μm, more preferably 40 to 200 μm, even more preferably 40 to 160 μm, further more preferably 40 to 100 μm. In the case where the substrate layer is formed of paper, in general, the basis weight thereof is preferably 20 to 150 g/m², more preferably 30 to 100 g/m².

Regarding the shape thereof, the substrate layer is not limited to a planar one, but may have special shapes such as a 3D shape.

The substrate layer may be subjected, on its one side or both sides, to surface treatment such as physical surface treatment (e.g., an oxidation method and a surface roughening method) or chemical surface treatment in order to enhance adhesiveness with other layers of the decorative sheet or with an adherend, and a primer layer may be formed thereon.

<Surface Protective Layer>

The surface protective layer preferably contains a cured product of a curable resin composition, from the viewpoint of bettering the scratch resistance of the decorative sheet. The cured product of a curable resin composition can be a resin component contained in the surface protective layer. In the case where the surface protective layer contains any other component than the resin component (for example, a hydroxyphenyltriazine compound of the general formula (I)), the cured product of a curable resin composition plays a role of a binder resin.

The proportion of the cured product of a curable resin composition is preferably 70% by mass or more, more preferably 90% by mass or more, even more preferably 95% by mass or more, further more preferably 100% by mass, relative to all the resin components constituting the surface protective layer.

The curable resin composition includes a thermosetting resin composition containing a thermosetting resin, an ionizing radiation curable resin composition containing an ionizing radiation curable resin, and a mixture thereof. Above all, from the viewpoint of increasing the crosslinking density of the surface protective layer and improving the surface properties such as scratch resistance thereof, an ionizing radiation curable resin composition is preferred. From the viewpoint of solvent-free coatability and of easy handleability, an electron beam curable resin composition is more preferred among ionizing radiation curable resin compositions.

The thermosetting resin composition is a composition comprising at least a thermosetting resin and is a resin composition that is cured by heating. Examples of the thermosetting resin include acrylic resin, urethane resin, phenol resin, urea-melamine resin, epoxy resin, unsaturated polyester resin, and silicone resin. In the thermosetting resin composition, such a curable resin is supplemented, if necessary, with a curing agent.

The ionizing radiation curable resin composition is a composition comprising a compound having an ionizing radiation curable functional group (hereinafter, also referred to as an "ionizing radiation curable compound"). The ionizing radiation curable functional group is a group that is cross-linked for curing by irradiation with ionizing radiation. Examples thereof preferably include functional groups having an ethylenic double bond, such as a (meth)acryloyl group, a vinyl group, and an allyl group. In this description, a (meth)acryloyl group means an acryloyl group or a methacryloyl group. Also in the present description, a (meth) acrylate means an acrylate or a methacrylate.

The ionizing radiation means electromagnetic wave or charged particle radiation having an energy quantum capable of polymerizing or cross-linking molecules. Usually, ultraviolet ray (UV) or electron beam (EB) is used. The ionizing radiation additionally includes electromagnetic wave such as X ray and γ ray, and charged particle radiation such as α ray and ion line.

Specifically, the ionizing radiation curable compound can be appropriately selected, for use, from among polymerizable monomers and polymerizable oligomers commonly used as conventional ionizing radiation curable resins.

The polymerizable monomer is preferably a (meth)acrylate monomer having a radical polymerizable unsaturated group in the molecule, particularly preferably a polyfunctional (meth)acrylate monomer. Here, "a (meth)acrylate" means "an acrylate or a methacrylate".

Examples of the polyfunctional (meth)acrylate monomer include (meth)acrylate monomers having two or more ionizing radiation curable functional groups in the molecule and having at least a (meth)acryloyl group as the functional group.

The number of functional groups in the polyfunctional (meth)acrylate monomer is preferably 2 or more and 8 or less, more preferably 2 or more and 6 or less, further preferably 2 or more and 4 or less, still further preferably 2 or more and 3 or less, from the viewpoint of improving processing characteristics, scratch resistance and weather resistance. These polyfunctional (meth)acrylates may be used singly or in combination of two or more thereof.

Examples of the polymerizable oligomer include (meth)acrylate oligomers having two or more ionizing radiation curable functional groups in the molecule and having at least a (meth)acryloyl group as the functional group. Examples thereof include urethane (meth)acrylate oligomers, epoxy (meth)acrylate oligomers, polyester (meth)acrylate oligomers, polyether (meth)acrylate oligomers, polycarbonate (meth)acrylate oligomers, and acrylic (meth)acrylate oligomers.

Further, the polymerizable oligomer additionally includes a highly-hydrophobic polybutadiene (meth)acrylate oligomer having a (meth)acrylate group in the side chain of a polybutadiene oligomer, a silicone (meth)acrylate oligomer having a polysiloxane bond in the main chain, an aminoplast resin (meth)acrylate oligomer modified with an aminoplast resin having a large number of reactive groups in a small molecule, or an oligomer having a cationic polymerizable functional group in the molecule, such as a novolak epoxy resin, a bisphenol-type epoxy resin, an aliphatic vinyl ether, and an aromatic vinyl ether.

These polymerizable oligomers may be used singly or in combination of two or more thereof. The polymerizable oligomer is preferably one or more selected from a urethane (meth)acrylate oligomer, an epoxy (meth)acrylate oligomer, a polyester (meth)acrylate oligomer, a polyether (meth)acrylate oligomer, a polycarbonate (meth)acrylate oligomer, and an acrylic (meth)acrylate oligomer, more preferably one or more selected from a urethane (meth)acrylate oligomer and a polycarbonate (meth)acrylate oligomer, even more preferably a urethane (meth)acrylate oligomer, from the viewpoint of improving processing characteristics, scratch resistance and weather resistance. Specifically, the surface protective layer preferably contains a cured product of a urethane (meth)acrylate oligomer. Also preferably, the ratio of the cured product of a urethane (meth)acrylate oligomer relative to the total amount of the resin components contained in the surface protective layer is 60% by mass or more, more preferably 80% by mass or more, even more preferably 90% by mass or more, further more preferably 100% by mass.

The urethane (meth)acrylate oligomer can be obtained, for example, by reaction of a polyol, an organic diisocyanate and a hydroxy(meth)acrylate.

The urethane (meth)acrylate oligomer is, from the viewpoint of toughness and flexibility, preferably such that the carbon number of the alkylene group derived from polyol which is the raw material is 1 to 6, more preferably 2 to 4.

The number of functional groups in such a polymerizable oligomer is preferably 2 or more and 8 or less, the upper limit is more preferably 6 or less, further preferably 4 or less, still further preferably 3 or less from the viewpoint of improving processing characteristics, scratch resistance and weather resistance.

The weight-average molecular weight of such a polymerizable oligomer is preferably 2,500 or larger and 7,500 or smaller, more preferably 3,000 or larger and 7,000 or smaller, further preferably 3,500 or larger and 6,000 or smaller, from the viewpoint of improving processing characteristics, scratch resistance and weather resistance. In this description, the weight-average molecular weight is an average molecular weight that is measured by GPC analysis and calculated on the basis of standard polystyrene.

The ionizing radiation curable resin composition can be used in combination with monofunctional (meth)acrylate for the purpose of, for example, decreasing the viscosity of the ionizing radiation curable resin composition. Such monofunctional (meth)acrylates may be used singly or in combination of two or more thereof.

In the case where the ionizing radiation curable compound is a UV-curable compound, the composition A preferably contains additives such as a photopolymerization initiator and a photopolymerization accelerator.

The photopolymerization initiator includes one or more selected from acetophenones, benzophenones, α-hydroxyalkylphenones, Michler's ketones, benzoin, benzyldimethyl ketals, benzoyl benzoates, α-acyloxime esters, and thioxanthones.

The photopolymerization accelerator can reduce polymerization inhibition by air during curing to increase the curing rate, and examples thereof include one or more selected from isoamyl p-dimethylaminobenzoate, and ethyl p-dimethylaminobenzoate.

As described above, the surface protective layer preferably contains a hydroxyphenyltriazine compound of the general formula (I). Also preferably, the surface protective layer contains any other additive such as an antioxidant and a light stabilizer.

The thickness of the surface protective layer is preferably 1.5 μm or more and 20 μm or less, more preferably 2 μm or more and 15 μm or less, further preferably 3 μm or more and 10 μm or less, from the viewpoint of the balance of processing characteristics, scratch resistance and weather resistance.

<Primer Layer>

Preferably, the decorative sheet has a primer layer in contact with the surface on the substrate layer side of the surface protective layer. The primer layer improves the adhesiveness between the substrate layer and the surface protective layer (in the case where the decorative sheet has a transparent resin layer, the adhesiveness between the transparent resin layer and the surface protective layer) to more readily better securement of long-term interlayer adhesiveness (so-called weather resistant adhesiveness) in outdoor exposure and scratch resistance.

The primer layer is mainly formed of a binder resin, and may optionally contain additives such as a UV absorbent and a light stabilizer. The UV absorbent in the primer layer is preferably a hydroxyphenyltriazine compound of the general formula (I).

The binder resin of the primer layer is preferably resins such as a urethane resin, an acrylic polyol resin, an acrylic resin, an ester resin, an amide resin, a butyral resin, a styrene resin, a urethane-acrylic copolymer, a polycarbonate urethane-acrylic copolymer (a urethane-acrylic copolymer derived from a polymer (polycarbonate polyol) having a carbonate bond in the polymer backbone and having two or more hydroxy groups at an end and/or a side chain), a vinyl chloride-vinyl acetate copolymer resin, a vinyl chloride-vinyl acetate-acrylic copolymer resin, a chlorinated propylene resin, a nitrocellulose resin (cellulose nitrate), and a cellulose acetate resin. These resins can be used singly or in combination of two or more thereof. The binder resin may also be a crosslinked and cured resin produced by adding a curing agent such as an isocyanate curing agent or an epoxy curing agent to these resins. Among these, one produced by crosslinking and curing a polyol resin such as an acrylpolyol resin with an isocyanate curing agent is preferred, and one produced by crosslinking and curing an acrylpolyol resin with an isocyanate curing agent is more preferred.

The thickness of the primer layer is preferably 1 μm or larger and 10 μm or smaller, more preferably 2 μm or larger and 8 μm or smaller, further preferably 3 μm or larger and 6 μm or smaller.

The decorative sheet may have a backside primer layer on the side opposite to the surface protective layer of the substrate layer, for the purpose of improving the adhesiveness to adherends.

<Transparent Resin Layer>

The decorative sheet may have a transparent resin layer between the substrate layer and the surface protective layer from the viewpoint of increasing strength. In the case where the decorative sheet has a primer layer, preferably, the transparent resin layer is positioned between the substrate layer and the primer layer. In the case where the decorative sheet has a decorative layer, preferably, the transparent resin layer is positioned between the decorative layer and the surface protective layer, from the viewpoint of protecting the decorative layer.

The resin to constitute the transparent resin layer includes a polyolefin resin, a polyester resin, a polycarbonate resin, an acrylonitrile-butadiene-styrene resin (hereinafter this may also be referred to as "ABS resin"), an acrylic resin, and a vinyl chloride resin. Among these, a polyolefin resin is preferred from the viewpoint of workability. These exemplified resins may be mixed to be the transparent resin layer, and further layers of one or more of these exemplified resins may be laminated to be the transparent resin layer. A polypropylene and a polyvinyl chloride resin are preferred as being able to control the moisture permeability of the decorative sheet to fall within a predetermined range to thereby improve both construction suitability and long-term adhesiveness with ease.

The content of the polyolefin resin in the transparent resin layer is, from the viewpoint of workability, preferably 50% by mass or more relative to the entire resin component in the transparent resin layer, more preferably 70% by mass or more, even more preferably 90% by mass or more.

The polyolefin resin of the transparent resin layer includes a polyethylene (low density, middle density, high density), a polypropylene, a polymethylpentene, a polybutene, an ethylene-propylene copolymer, a propylene-butene copolymer, an ethylene-vinyl acetate copolymer, an ethylene-acrylic acid copolymer, and an ethylene-propylene-butene copolymer. Among these, a polyethylene (low density, middle density, high density), a polypropylene, an ethylene-propylene copolymer, and a propylene-butene copolymer are preferred, and a polypropylene is more preferred.

The polypropylene and the polyvinyl chloride resin that are preferred from the viewpoint of moisture permeability are the same as those exemplified hereinabove for the substrate.

The transparent resin layer may contain additives such as a UV absorbent, a light stabilizer and a colorant. In the case where the transparent resin layer contains a UV absorbent, the UV absorbent is preferably a hydroxyphenyltriazine compound of the general formula (I).

The thickness of the transparent resin layer is, from the viewpoint of the balance of scratch resistance, workability and weather resistance, preferably 20 μm or more and 150 μm or less, more preferably 40 μm or more and 120 μm or less, even more preferably 60 μm or more and 100 μm or less.

<Decorative Layer>

The decorative sheet preferably has a decorative layer at an arbitrary location of the decorative sheet from the viewpoint of improving design. The location where the decorative layer is formed is preferably on the side nearer to the substrate layer, from the viewpoint of enhancing the weather resistance of the decorative layer. For example, in the case where the decorative sheet has a primer layer, the decorative layer is preferably positioned between the substrate layer and the primer layer. In the case where the decorative sheet has a transparent resin layer, the decorative layer is preferably positioned between the substrate layer and the transparent resin layer.

The decorative layer may be, for example, a colored layer that covers the whole surface (so-called solid colored layer), or may be a picture layer formed by printing various patterns using an ink and a printer. The picture (pattern) of the picture layer maybe a woodgrain pattern such as a growing ring or a conduit groove of a surface of a lumber board, a grain pattern of a surface of a stone slab such as marble or granite, a texture pattern of a surface of a texture, a leather drawing pattern of a surface of a leather, or a geometrical pattern, a letter, a figure, or a combination of these.

The ink for use in the decorative layer is an appropriate mixture of a binder resin with a colorant such as a pigment or a dye, an extender pigment, a solvent, a stabilizer, a plasticizer, a catalyst, a curing agent, a UV absorbent, a light stabilizer, etc.

Examples of the binder resin for the decorative layer include, but are not particularly limited to, a urethane resin, an acrylic polyol, an acrylic resin, a polyester, an amide resin, a butyral resin, a styrene resin, a urethane-acryl copolymer, a vinyl chloride-vinyl acetate copolymer, a vinyl chloride-vinyl acetate-acryl copolymer, a propylene chloride resin, a nitrocellulose resin, and a cellulose acetate resin. Various types of resins can be used, such as one-component curable resins and two-component curable resins involving a curing agent such as an isocyanate compound.

The colorant is preferably a pigment excellent in masking property and weather resistance. Examples of the pigment include the same as those listed as examples of the pigment for the substrate layer.

The content of the colorant is preferably 5 parts by mass or more and 90 parts by mass or less, more preferably 15 parts by mass or more and 80 parts by mass or less, further preferably 30 parts by mass or more and 70 parts by mass or less, relative to 100 parts by mass of the resin constituting the decorative layer.

The decorative layer may contain additives such as a UV absorbent, a light stabilizer and a colorant.

The thickness of the decorative layer can be appropriately selected according to the desired picture and is preferably 0.5 μm or larger and 20 μm or smaller, more preferably 1 μm or larger and 10 μm or smaller, further preferably 2 μm or larger and 5 μm or smaller, from the viewpoint of masking the ground color of an adherend and improving design.

<Adhesive Layer A>

In the case where the decorative sheet has a transparent resin layer, preferably, an adhesive layer A is formed between the substrate layer and the transparent resin layer for the purpose of improving the adhesiveness between the two layers.

In the case of further having a decorative layer between the substrate layer and the transparent resin layer, the positional relationship between the adhesive layer A and the decorative layer is not particularly limited. Specifically, the decorative layer, the adhesive layer A and the transparent resin layer may be located in this order from the side nearer to the substrate layer, or the adhesive layer A, the decorative layer and the transparent resin layer may be located in this order from the side nearer to the substrate layer.

The adhesive layer A can be constituted by a general-purpose adhesive, for example, a urethane adhesive, an acrylic adhesive, an epoxy adhesive, or a rubber adhesive. Among these adhesives, a urethane adhesive is preferred from the viewpoint of adhesive power.

Examples of the urethane adhesive include adhesives that uses a two-component curable urethane resin containing any of various types of polyol compounds such as a polyether polyol, a polyester polyol or an acrylic polyol, and a curing agent such as an isocyanate compound.

The thickness of the adhesive layer A is preferably 0.1 μm or larger and 30 μm or smaller, more preferably 1 μm or larger and 15 μm or smaller, further preferably 2 μm or larger and 10 μm or smaller.

The above-mentioned decorative layer, adhesive layer A, primer layer and surface protective layer can be formed by applying coating liquids that contain a composition to form each layer, according to a known method of a gravure printing method, a bar coating method, a roll coating method, a reverse roll coating method, or a comma coating method, and optionally drying and curing the layers.

The transparent resin layer can also be formed, for example, by hot melt extrusion.

The decorative sheet may be given a desired uneven shape (also referred to as an uneven pattern) by embossing. (This may be referred to as patterning.)

In the case of performing embossing, for example, the decorative sheet is heated to preferably 80° C. or higher and 260° C. or lower, more preferably 85° C. or higher and 160° C. or lower, further preferably 100° C. or higher and 140° C. or lower, and an embossing plate can be pressed against the decorative sheet for embossing. The location against which the embossing plate is pressed is preferably the surface protective layer side of the decorative sheet.

<Property of Decorative Sheet>

The decorative sheet of the present invention preferably has a moisture permeation rate of 0.75 g/m²·24 h or more and 45 g/m²·24 h or less. The decorative sheet having such a moisture permeation rate is excellent in construction suitability, long-term adhesiveness, processing suitability and weather resistance (especially suppression of appearance change in exposure to UV rays in sunlight).

Specifically, when the moisture permeability of the decorative sheet falls within the range described above, initial adhesion strength in a construction process is improved. Therefore, the separation of an end face of the decorative sheet due to insufficient initial adhesion strength, so-called spring-back, can be prevented in construction. Hence, construction efficiency is improved. On the other hand, in the case of preparing the decorative material via an adhesive layer from a decorative sheet and an adherend, mainly the degradation of the adhesive layer between the decorative sheet and the adherend can be suppressed. Therefore, peeling caused by the degradation is suppressed, and long-term adhesiveness is improved without causing peeling even in long-term use. Specifically, when the moisture permeability of the decorative sheet falls within the above-mentioned range, construction suitability can be improved by improving the initial adhesion strength in a construction step and in addition, long-term adhesiveness to prevent peeling even in long-term use can also be improved.

The effect of long-term adhesiveness owing to the moisture permeability to fall within the above-mentioned range can be attained when at least any layer of the decorative sheet contains a hydroxyphenyltriazine compound of the general formula (I), In other words, in the case where the at least any layer of the decorative sheet does not contain a hydroxyphenyltriazine compound of the general formula (I), the substrate and the adhesive layer are degraded owing to molecular chain cleavage or photochemical reaction of the resin by action of UV rays, even when the moisture permeability falls within the above-mentioned range, and consequently, mechanical strength in the vicinity of the adhering interface may lower and, in addition, the moisture permeability of the decorative sheet is thereby increased and therefore the long-term adhesiveness thereof cannot be bettered.

On the other hand, even when at least any layer of the decorative sheet contains a hydroxyphenyltriazine compound of the general formula (I), but in the case where the moisture permeability of the decorative sheet is more than 45 g/m²·24 h, weather resistance relating to appearance change also readily worsen in addition to decrease in long-term adhesiveness. It is considered that the reason may be because "with the increase in the moisture permeability of the decorative sheet, the permeability of the UV absorbents contained in the decorative sheet may also increase, so that the UV absorbents may readily bleed out" and "reduction in the UV absorbents in the decorative sheet may increase along with long-term outdoor exposure and, as a result, durability of the decorative sheet against UV rays may gradually lower".

The effects brought about by the moisture permeability that falls within the range described above will be described more specifically. First, when the moisture permeability is 0.75 g/m²·24 h or more, poor adhesion caused by poor curing of an adhesive used in an adhesive layer is prevented in preparing a decorative material by affixing the decorative sheet to an adherend via the adhesive layer. Therefore, initial adhesion strength is improved, and construction suitability is improved. On the other hand, when the moisture permeability is 45 g/m²·24 h or less, the degradation of the base material caused by the influence of moisture in the atmosphere, the wind and rain, and ultraviolet ray from insolation, and the hydrolytic degradation of the adhesive used in the adhesive layer can be suppressed in long-term use. Therefore, the decorative sheet is less likely to be peeled from the adherend, and long-term adhesiveness is improved without causing peeling even in long-term use. Accordingly, the decorative sheet has a moisture permeability that falls within the range described above, and can thereby improve construction suitability based on high initial adhesion strength in a construction process and long-term adhesiveness without causing peeling even in long-term use, at the same time.

The moisture permeability is 1.2 g/m²·24 h or more, more preferably 1.5 g/m²·24 h, further preferably 2.5 g/m²·24 h or more, still further preferably 4.5 g/m²·24 h or more, the upper limit is preferably 40 g/m²·24 h or less, more preferably 35 g/m²·24 h or less, further preferably 30 g/m²·24 h or less, still further preferably 20 g/m²·24 h or less, from the viewpoint of improving construction suitability as well as long-term adhesiveness.

The moisture permeability can be adjusted, as mentioned above, mainly by the type of the material constituting the substrate, or in the case of having a resinous resin layer, by the type of the material constituting the resin layer, etc.

[Resin Composition]

The resin composition of the present invention is a resin composition for surface protective layer containing a curable resin composition and a hydroxyphenyltriazine compound of the following general formula (I).

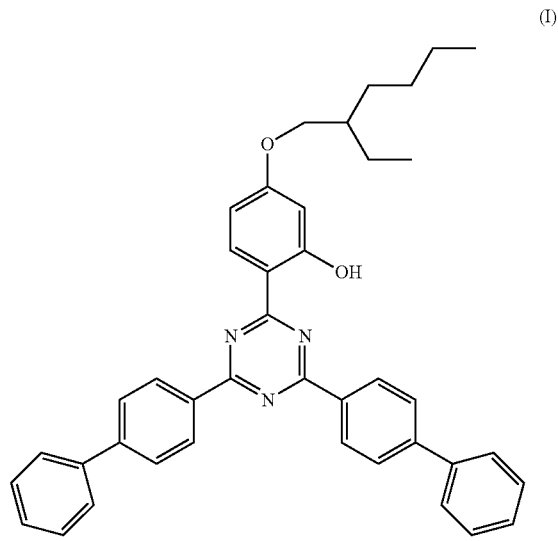

(I)

The curable resin composition in the resin composition is the same as the embodiment of the curable resin composition for the surface protective layer of the decorative sheet mentioned hereinabove. The blending ratio of the hydroxyphenyltriazine compound in the resin composition is also the same as the embodiment in the curable resin composition for the surface protective layer of the decorative sheet mentioned above.

[Decorative Material]

The decorative material of the present invention comprises an adherend and the decorative sheet of the present invention described above. Specifically, the adherend and the decorative sheet are laminated such that a face of the adherend requiring decoration and a face of the decorative sheet on the substrate layer side are opposed to each other.

<Adherend>

Examples of the adherend include plates such as flat plates or curved plates made of various materials to be mentioned below; three-dimensionally shaped articles such as columns and polygonal prisms made of various materials to be mentioned below; and sheets and films made of various materials to be mentioned below.

Various materials include: woody members, such as wood veneer, plywood, or laminated wood formed of various types of wood such as Japanese cedar, Japanese cypress, pine, or lauan, as well as wood fiberboards such as particle boards and MDF (medium-density fiberboard); metal members of a metal such as iron, aluminum, copper or an alloy of one or more these metals; pottery industry members, such as glass and other ceramics, as well as non-ceramic pottery industry materials such as gypsum, and cement, ALC (autoclaved lightweight concrete), and calcium silicate; and resin members of an acrylic resin, a polyester, a polystyrene, a polyolefin resin such as polypropylene, an ABS (acrylonitrile-butadiene-styrene copolymer) resin, a phenolic resin, a vinyl chloride resin, a cellulose resin, rubber, etc. These materials can be used singly or in combination of two or more thereof.

The adherend can be appropriately selected from among those described above according to a purpose. For example, at least one member selected from the group consisting of a wood member, a metal member and a resin member is preferred for use for building interior and exterior members such as walls, ceilings, and floors, or for joinery or fixture members such as window frames, doors, railings, baseboards, crown moldings, and covers. At least one member selected from the group consisting of a metal member and a resin member to be an adherend is preferred for use for exterior members such as front doors and joinery such as window frames and doors.

The thickness of the adherend can be appropriately selected according to the intended purpose and the material thereof, and is preferably 0.1 mm or larger and 100 mm or smaller, more preferably 0.3 mm or larger and 5 mm, further preferably 0.5 mm or larger and 3 mm or smaller.

<Adhesive Layer B>

The adherend and the decorative sheet are preferably laminated via an adhesive layer B, in order to obtain excellent adhesiveness.

The adhesive to constitute the adhesive layer B is not particularly limited, and a known adhesive can be used. Examples thereof preferably include adhesives such as moisture curing adhesives, anaerobic curing adhesives, dry curing adhesives, UV curing adhesives, heat-sensitive adhesives (e.g., hot-melt adhesives), and pressure-sensitive adhesives. A moisture curing adhesive and a heat-sensitive adhesive are preferred in consideration of compatibility with the decorative sheet of the present embodiment having a predetermined moisture permeability, easy handling, etc. Particularly, the heat-sensitive adhesive is preferred because adhesive power rises up to saturation at the same time with the cooling and solidification of a melted adhesive layer in a liquid state. The moisture curing adhesive, when used in combination with the decorative sheet of the present embodiment, easily produces the initial adhesion strength of the adhesive used in the adhesive layer because the moisture curing adhesive can come into contact with moderate humidity in a construction process. On the other hand, the moisture curing adhesive suppresses reduction in adhesiveness caused by hydrolytic degradation because the moisture curing adhesive does not come into contact with excessive humidity. As a result, much better construction suitability as well as long-term adhesiveness are easily obtained. The moisture curing adhesive is also preferred from the viewpoint of easy handling, etc.

The adhesive to constitute the adhesive layer B includes those containing one or more selected from resins such as an acrylic resin, a urethane resin, a vinyl chloride resin, a vinyl acetate resin, a vinyl chloride-vinyl acetate copolymer, a styrene-acryl copolymer, a polyester, and a polyamide. The adhesive of the adhesive layer B may also be a two-component curable polyurethane adhesive or polyester adhesive containing an isocyanate compound or the like as a curing agent.

A pressure-sensitive adhesive may also be used in the adhesive layer. The pressure-sensitive adhesive to be used here can be one appropriately selected from acrylic-based, urethane-based, silicone-based or rubber-based pressure-sensitive adhesives.

A moisture curing adhesive, one of the adhesives preferably used in the present embodiment, containing urethane resin as resin, contains a prepolymer having isocyanate groups at molecular ends, as an essential component. The prepolymer is usually a polyisocyanate prepolymer having one or more isocyanate groups at each of both molecular ends and is in the state of a solid thermoplastic resin at ordinary temperature. Examples of such a polyisocyanate prepolymer include prepolymers obtained using polyester polyol that is a crystalline solid at ordinary temperature as a polyol component and using polyisocyanate containing 4,4-diphenylmethane diisocyanate or tolylene diisocyanate as a polyisocyanate component.

The thickness of the adhesive layer B is not particularly limited and is preferably 1 μm or larger and 100 μm or smaller, more preferably 5 μm or larger and 50 μm or smaller, further preferably 10 μm or larger and 30 μm or smaller, from the viewpoint of obtaining excellent adhesiveness.

<Production Method for Decorative Material>

The decorative material can be produced through the step of laminating the decorative sheet with an adherend.

This step is the step of laminating the decorative sheet of the present invention with an adherend such that a face of the adherend requiring decoration and a face of the decorative sheet on the substrate layer side are opposed to each other. Examples of the method for laminating the decorative sheet with the adherend include a lamination method which involves laminating the decorative sheet to a plate-like adherend via adhesive layer B by applying pressure thereto using a pressure roller.

In the case of using a hot-melt adhesive (heat-sensitive adhesive) as the adhesive, the warming temperature is preferably 160° C. or higher and 200° C. or lower, though varying depending on the type of the resin constituting the adhesive, and is preferably 100° C. or higher and 130° C. or lower for a reactive hot-melt adhesive. Vacuum molding is generally performed under heating. Its temperature is preferably 80° C. or higher and 130° C. or lower, more preferably 90° C. or higher and 120° C. or lower.

The decorative material thus obtained can be arbitrarily cut, and the surface or a butt end portion can be arbitrarily decorated by grooving, chamfering, or the like using a cutting machine such as a router or a cutter. The decorative material can be used for various purposes, for example, for various members such as building interior members such as walls, ceilings and floors, or exterior members such as exterior walls, eave ceilings, roofs, fences, and gates, joinery or fixture members such as window frames, doors, door frames, railings, baseboards, crown moldings, and covers, as well as surface decorative plates for cabinets of kitchens, furniture, home electric appliances and OA appliances, and also for interior and exterior members of vehicles.

EXAMPLES

Next, the present invention will be described in more detail with reference to Examples. However, the present invention is not limited by these examples by any means.
1. Evaluation and Measurement The decorative sheets obtained in Examples 1 to 3 and Comparative Examples 1 to 6 were evaluated in point of the following 1-1 to 1-3. The results are shown in Table 1.
1-1. Weather Resistance (Absorbance Retention Rate)

Using a UV-visible-near IR spectrophotometer (trade name: U-4000 by Hitachi Limited) and according to JIS K0115:2004, the absorbance at a wavelength of 330 nm of a laminate for absorbance measurement produced in the following [2] (a laminate produced by forming a primer layer and a surface protective layer on a transparent resin layer) was measured. Next, the laminates produced in Examples and Comparative Examples were tested in an accelerated weather resistance test with a metal halide lamp (MWOM) for 48 hours, in which each sample was exposed to UV rays for 20 hours under the following irradiation condition and then was condensed for 4 hours under the following condensation condition as one cycle, and the cycle was repeated. After the accelerated weather resistance test, the absorbance of the decorative sheet at a wavelength of 330 nm was measured in the same manner as above, and the absorbance retention rate was calculated according to the following formula. The results are shown in Table 1. The test apparatus and the test condition of the accelerated weather resistance test are as mentioned below.

Absorbance Retention Rate=(absorbance after accelerated weather resistance test/absorbance before accelerated weather resistance test)×100

<Test Apparatus>
"Daipla Metal Weather", trade name by Daipla Wintes Co., Ltd.
<Irradiation Condition>
Illumination intensity: 65 mW/cm$^2$,
Black panel temperature: 63° C.
Moisture in basin: 50% RH
Time: 20 hours
<Condensation Condition>
Illumination intensity: 0 mW/cm$^2$,
Moisture in basin: 98% RH
Time: 4 hours
1-2. Weather Resistance (Cracking Time)

The decorative sheets obtained in Examples 1 to 3 and Comparative Examples 1 to 6 were tested in the same accelerated weather resistance test as in 1-1 until the surface protective layers were cracked. The cracking time is shown in Table 1.
1-3. Temporal Stability (Bleed-Out)

The decorative sheets obtained in Examples 1 to 3 and Comparative Examples 1 to 6 were left in an environment at 40° C. and at a humidity of 90% for 1 week, then taken out of the environment, and thereafter the appearance of the decorative sheets were visually observed from the side of the surface protective layer, and evaluated according to the following criteria. The results are shown in Table 1.
A: No appearance change was found.
C: Appearance change by whitening, luster variation or deposition of sheet components was found.
2. Production of Laminate for Absorbance Measurement in the Above "1-1"

Laminate for Absorbance Measurement of Example 1

A transparent resin layer (thickness: 80 μm) prepared by hot-melt extrusion of a transparent polypropylene resin through a T-die extruder was used as a substrate layer. The surface thereof was processed for corona discharge treatment, then a coating liquid containing a resin composition including a resin component of a polycarbonate-based urethane acryl copolymer and an acryl polyol was applied thereto according to a gravure printing method to form a primer layer (thickness after drying: 4 μm).

Further, to the primer layer, an ionizing radiation-curable resin composition 1 mentioned below was applied according to a roll coating method to form an uncured resin layer, then this was irradiated with electron beams (acceleration voltage: 175 kV, 5 Mrad (50 kGy)) so that the uncured resin layer was cured to form a surface protective layer (thickness: 5 μm), thereby producing a laminate for absorbance measurement of Example 1 (a laminate having a primer layer and a surface protective layer formed on a transparent resin layer).

Laminates for Absorbance Measurement of Examples 2 and 3, and Comparative Examples 1 to 6

Laminates for absorbance measurement of Examples 2 and 3 and Comparative Examples 1 to 6 were produced in the same manner as that for the laminate for absorbance measurement of Example 1, except that the surface protective layer was changed to a surface protective layer of decorative sheets of Examples 2 and 3 and Comparative Examples 1 to 6 mentioned below.
The laminates for absorbance measurement of Examples 1 to 3 and Comparative Examples 1 to 6 were not embossed from the side of the surface protective layer.
3. Production of Decorative Sheet Example 1

A polypropylene resin sheet processed for corona discharge treatment on both surfaces (thickness: 60 μm) was used as a substrate, and a printing ink containing a two-component curable acryl-urethane resin as a binder and containing a colorant in an amount of 30 parts by mass relative to 100 parts by mass of the binder resin was applied to one surface of the substrate according to a gravure printing method to form a woodgrain pattern decorative layer (thickness: 3 μm) thereon, and a two-component curable urethane-nitrocellulose mixed resin composition was applied to the other surface to form a backside primer layer (thickness: 3 μm).

To the decorative layer, a transparent polyurethane resin adhesive was applied to form an adhesive layer (thickness after drying: 3 μm), and a transparent polypropylene resin was hot melt-extruded thereto through a T-die extruder to form transparent resin layer (thickness: 80 μm).

Next, the surface of the transparent resin layer was subjected to corona discharge treatment, and then a coating liquid containing a resin composition containing a resin component composed of a polycarbonate urethane-acryl copolymer and an acryl polyol was applied thereto according to a gravure printing method to form a primer layer (thickness after drying: 4 μm).

Further, to the primer layer, an ionizing radiation curable resin composition 1 mentioned below was applied according to a roll coating method to form an uncured resin layer thereon, which was then irradiated with electron beams (acceleration voltage: 175 kV, 5 Mrad (50 kGy)) to be cured to form a surface protective layer (thickness: 5 μm).

Next, the surface protective layer was embossed from front side thereof to produce a decorative sheet of example 1.

<Ionizing Radiation (Electron Beam) Curable Resin Composition 1>
Electron curable resin (trifunctional urethane acrylate oligomer, weight-average molecular weight: about 5000) 100 parts by mass
UV absorbent (hydroxyphenyltriazine compound of general formula (I) (UVA1)) 6 parts by mass Example 2

The same process to form a backside primer layer, a substrate layer, a decorative layer, a transparent resin layer and a primer layer in that order as in Example 1 was carried out.

Next, to the primer layer, a thermosetting resin composition 1 mentioned below was applied, and dried to form a surface protective layer (thickness: 5 μm).

Next, the surface protective layer was embossed from front side thereof to produce a decorative sheet of Example 2.

<Thermosetting Resin Composition 1>
Two-component acryl-urethane resin 100 parts by mass
UV absorbent (hydroxyphenyltriazine compound of general formula (I) (UVA1)) 6 parts by mass Example 3

A decorative sheet of Example 3 was produced in the same manner as in Example 1, except that the content of the UV absorbent in the ionizing radiation curable resin composition 1 was changed as in Table 1.

Comparative Examples 1, 3, 5, 6

Decorative sheets of Comparative Examples 1, 3, 5 and 6 were produced in the same manner as in Example 1, except that the type and the content of the UV absorbent in the ionizing radiation curable resin composition 1 were changed as in Table 1.

In Table 1, UVA2 is a hydroxyphenyltriazine compound represented by the following general formula (II). UVA3 in Table 1 is a hydroxyphenyltriazine compound represented by the following general formula (III).

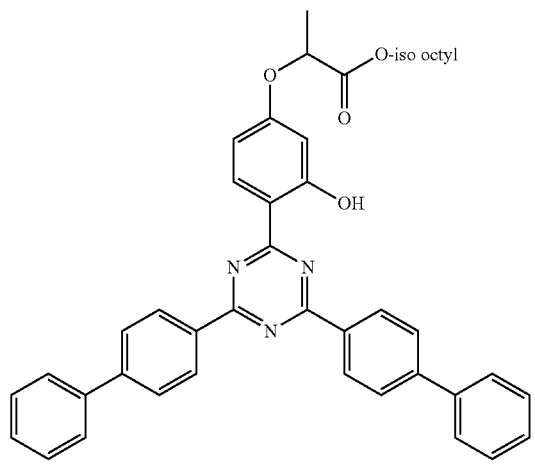

(II)

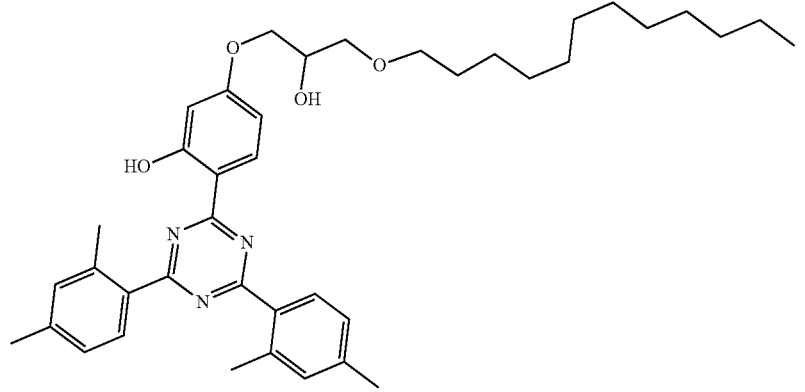

(III)

Comparative Examples 2, 4

Decorative sheets of Comparative Examples 2 and 4 were produced in the same manner as in Example 2, except that the type and the content of the UV absorbent in the thermosetting resin composition 1 were changed as in Table 1.

a peeling test was conducted in a temperature environment of 25° C. under conditions involving a tensile rate of 50 mm/min and a peeling direction of 90° using Tensilon Universal Material Testing Instrument ("Tensilon RTC-1250A (trade name)" by Orientec Co., Ltd.). Peeling strength was measured and evaluated according to criteria

TABLE 1

|  |  |  | Example | | | Comparative Example | | | | | |
|---|---|---|---|---|---|---|---|---|---|---|---|
|  |  |  | 1 | 2 | 3 | 1 | 2 | 3 | 4 | 5 | 6 |
| Surface Protective Layer | Resin | Electron Beam Curable Resin | 100 | — | 100 | 100 | — | 100 | — | 100 | 100 |
|  |  | Thermosetting Resin | — | 100 | — | — | 100 | — | 100 | — | — |
|  | UV Absorbent | UVA1 | 6 | 6 | 21 | — | — | — | — | — | — |
|  |  | UVA2 | — | — | — | 6 | 6 | — | — | 21 | — |
|  |  | UVA3 | — | — | — | — | — | 6 | 6 | — | 21 |
| Weather Resistance | Absorbance Retention Rate | | 75% | 75% | 72% | 65% | 65% | 40% | 40% | 60% | 38% |
|  | Cracking Time (hour) | | 1400 | 1200 | 1500 | 1000 | 900 | 900 | 700 | 1100 | 1000 |
| Temporal Stability (bleed-out) | | | A | A | A | A | A | A | A | C | C |

As shown in Table 1, it is confirmed that the decorative sheets of Examples 1 to 3 can suppress bleed-out and can maintain long-term weather resistance to a very good extent.

4. Evaluation Relating to Moisture Permeability

The decorative sheets obtained in Examples 4 to 6, Comparative Example 7 and Reference Examples 1 and 2 mentioned below were evaluated in point of moisture permeability of the following 4-1 to 4-4. The results are shown in Table 2.

4-1. Measurement of Moisture Permeability

The decorative sheets obtained in Examples 4 to 6, Comparative Example 7 and Reference Examples 1 and 2 were tested in a moisture permeability test method (Cup Method) for moisture-resistant wrapping materials prescribed in JIS Z0208:1976 to measure the moisture permeability thereof.

4-2. Evaluation of Construction Suitability

A decorative sheet obtained in Examples 4 to 6, Comparative Example 7 and Reference Examples 1 and 2 was affixed to a tabular adherend having a width of 25 mm (material: polyvinyl chloride (PVC)) via an adhesive layer having a thickness of 50 μm prepared by melting a moisture-curable hot-melt urethane resin adhesive (polyurethane prepolymer having isocyanate groups in the molecule, "1308.20 (trade name)" by TAKA Corporation) at 120° C. The adhesive layer was cooled and solidified at room temperature (23° C.) and left for 1 hour in an environment of 90° C. to prepare a sample. A peeling test was conducted in a temperature environment of 25° C. under conditions involving a tensile rate of 10 mm/min, a peeling direction of 90°, and a chuck distance of 30 mm using Tensilon Universal Material Testing Instrument ("Tensilon RTC-1250A (trade name)" by Orientec Co., Ltd.). Peeling strength was measured as initial adhesion strength and evaluated according to criteria given below. A sample given a score of B or higher passed the evaluation of construction suitability.

A: The peeling strength was 1.0 N/mm or more.
B: The peeling strength was 0.5 N/mm or more and less than 1.0 N/mm.
C: The peeling strength was less than 0.5 N/mm.

4-3. Evaluation of Long-Term Adhesiveness

The sample prepared in the preceding section "4-2. Evaluation of Construction Suitability" was left for 6 weeks in a hot and humid environment of 70° C. and 90% RH. Then, given below. A sample given a score of B or higher passed the evaluation of long-term adhesiveness.

A: The peeling strength was 2.0 N/mm or more.
B: The peeling strength was 1.0 N/mm or more and less than 2.0 N/mm.
C: The peeling strength was less than 1.0 N/mm.

4-4. Workability

Uplift of the decorative material was visually confirmed in a bent portion (bending angle: 1 mm R) during affixing (lamination) in the preparation of a sample in the preceding section "3-2. Evaluation of Construction Suitability" and evaluated according to criteria given below. A sample given a score of B or higher passed workability.

A: No uplift was confirmed.
B: The uplift was hardly confirmed.
C: The uplift was confirmed, and peeling occurred.

Example 4

A decorative sheet of Example 4 was produced in the same manner as in Example 1, except that, in Example 1, the substrate layer was a polypropylene resin sheet (thickness: 80 μm, degree of crystallinity: 70%, propylene-ethylene random copolymer (ethylene content: 4.5% by mass or less)).

Example 5

A decorative sheet of Example 5 was produced in the same manner as in Example 1, except that, in Example 1, the substrate layer was a polypropylene resin sheet (thickness: 60 μm, degree of crystallinity: 50%, propylene-ethylene random copolymer (ethylene content: 4.5% by mass or less)).

Example 6

A decorative sheet of Example 6 was produced in the same manner as in Example 1, except that, in Example 1, the substrate layer was a polypropylene resin sheet (thickness: 60 μm, degree of crystallinity: 40%, propylene-ethylene random copolymer (ethylene content: 4.5% by mass or less)), and the thickness of the transparent resin layer was 40 μm.

Comparative Example 7

A decorative sheet of Comparative Example 7 was produced in the same manner as in Comparative Example 1, except that, in Comparative Example 1, the substrate layer was a polypropylene resin sheet (thickness: 100 μm, degree of crystallinity: 70%, propylene-ethylene random copolymer (ethylene content: 4.5% by mass or less)), and the thickness of the transparent resin layer was 100 μm.

Reference Example 1

A decorative sheet of Reference Example 1 was produced in the same manner as in Comparative Example 1, except that, in Comparative Example 1, the substrate layer was a polyvinyl chloride resin sheet (thickness: 120 μm, formed by extrusion molding of a resin composition prepared by adding 33 parts by mass of a polyester-based plasticizer (adipic acid-based polyester) as a plasticizer to 100 parts by mass of a polyvinyl chloride resin), and the adhesive layer A and the transparent resin layer were not formed.

Reference Example 2

A decorative sheet of Reference Example 2 was produced in the same manner as in Comparative Example 1, except that, in Comparative Example 1, the substrate layer was a polyvinyl chloride resin sheet (thickness: 120 μm, formed by extrusion molding of a resin composition prepared by adding 38 parts by mass of a phthalate-based plasticizer (undecyl phthalate (DUP)) as a plasticizer to 100 parts by mass of a polyvinyl chloride resin), and the adhesive layer A and the transparent resin layer were not formed.

TABLE 2

|  | Example | | | Comparative Example | Reference Example | |
|---|---|---|---|---|---|---|
|  | 4 | 5 | 6 | 7 | 1 | 2 |
| Moisture Permeability (g/m² · 24 h) | 1.5 | 5 | 10 | 0.5 | 50 | 35 |
| Construction Suitability | B | A | A | C | A | A |
| Long-Term Adhesiveness | A | A | A | A | C | B |
| Workability | A | A | A | A | C | A |

From the results in Table 2, it is confirmed that the decorative sheets having a property of moisture permeability of 0.75 g/m²·24 h or more and 45 g/m²·24 h or less can have good construction suitability, long-term adhesiveness and workability.

Though not shown in the Table, the evaluation relating to the absorbance retention rate, the cracking time and bleed-out in Examples 4 to 6 was equal to that in Example 1. In addition, the evaluation relating to the absorbance retention rate, the cracking time and the bleed-out in Comparative Example 7 was equal to that in Comparative Example 1.

INDUSTRIAL APPLICABILITY

The decorative sheet of the present invention is extremely good in bleed-out suppression and long-term weather resistance maintenance, and is therefore favorably used as decorative sheets for members such as exterior members of front doors, and joinery such as window frames and doors that are used in environments exposed to direct sunlight.

REFERENCE SIGNS LIST

100: Decorative Sheet
10: Surface Protective layer
20: Primer Layer
30: Transparent Resin Layer
40: Decorative Layer
50: Substrate Layer

The invention claimed is:

1. A decorative sheet having at least a substrate layer and a surface protective layer, and containing a hydroxyphenyltriazine compound represented by the following general formula (I) in at least any layer of the decorative sheet:

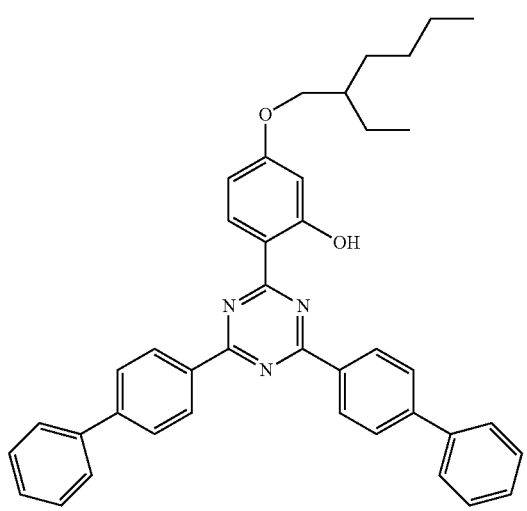

(I)

wherein the decorative sheet having a moisture permeability, as measured according to a moisture permeability test method (Cup Method) for moisture-resistant wrapping materials prescribed in JIS Z0208:1976, of 7 g/m²·24 h or more and 45 g/m²·24 h or less.

2. The decorative sheet according to claim 1, wherein the surface protective layer contains a hydroxyphenyltriazine compound represented by the general formula (I).

3. The decorative sheet according to claim 1, having one or more layers selected from a transparent resin layer and a primer layer between the substrate layer and the surface protective layer, containing a hydroxyphenyltriazine compound represented by the general formula (I) in any of the transparent resin layer, the primer layer and the surface protective layer.

4. The decorative sheet according to claim 1, having a decorative layer between the substrate and the surface protective layer.

5. The decorative sheet according to claim 1, wherein the surface protective layer contains a cured product of a curable resin composition.

6. The decorative sheet according to claim 1, having a moisture permeability, as measured according to a moisture permeability test method (Cup Method) for moisture-resistant wrapping materials prescribed in JIS Z0208:1976, of 10 g/m²·24 h or more and 35 g/m²·24 h or less.

7. A decorative material having an adherend and a decorative sheet of claim 1.

8. The decorative material according to claim 7, having an adhesive layer composed of a urethane adhesive, between the decorative sheet and the adherend.

9. The decorative material according to claim 8, wherein the urethane adhesive is a moisture-curable adhesive.

10. The decorative material according to claim 7, wherein the adherend is a metal member or a resin member.

* * * * *